(12) United States Patent
Evulet et al.

(10) Patent No.: US 8,191,349 B2
(45) Date of Patent: Jun. 5, 2012

(54) SYSTEM AND METHOD FOR LOW EMISSIONS COMBUSTION

(75) Inventors: Andrei Tristan Evulet, Florence (IT); Ahmed Mostafa Elkady, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/048,989

(22) Filed: Mar. 16, 2011

(65) Prior Publication Data

US 2011/0162342 A1    Jul. 7, 2011

Related U.S. Application Data

(62) Division of application No. 11/610,876, filed on Dec. 14, 2006, now abandoned.

(51) Int. Cl.
*F02G 1/00* (2006.01)
*F02G 3/00* (2006.01)

(52) U.S. Cl. ............. 60/39.5; 60/39.52; 60/39.511; 60/783

(58) Field of Classification Search ............ 60/39.5, 60/39.52, 39.511, 783, 39.182
See application file for complete search history.

(56) References Cited

U.S. PATENT DOCUMENTS

| | | | |
|---|---|---|---|
| 4,545,787 A | 10/1985 | Hegarty | |
| 5,388,395 A | 2/1995 | Scharpf et al. | |
| 5,441,990 A | 8/1995 | Robin et al. | |
| 5,459,944 A | 10/1995 | Tatsutani et al. | |
| 5,724,805 A * | 3/1998 | Golomb et al. | 60/783 |
| 5,740,673 A | 4/1998 | Smith et al. | |
| 5,832,712 A | 11/1998 | Ronning et al. | |
| 6,363,709 B2 * | 4/2002 | Kataoka et al. | 60/775 |
| 6,596,780 B2 | 7/2003 | Jahnke et al. | |
| 6,945,029 B2 * | 9/2005 | Viteri | 60/39.17 |
| 2004/0065088 A1 * | 4/2004 | Viteri et al. | 60/772 |
| 2004/0244381 A1 | 12/2004 | Becker | |
| 2005/0076645 A1 * | 4/2005 | Frutschi et al. | 60/772 |
| 2006/0248872 A1 | 11/2006 | Bachovchin et al. | |
| 2008/0011160 A1 | 1/2008 | Bowman et al. | |
| 2008/0134660 A1 | 6/2008 | Finkenrath et al. | |
| 2009/0107074 A1 | 4/2009 | Leininger et al. | |
| 2010/0018218 A1 * | 1/2010 | Riley et al. | 60/783 |

FOREIGN PATENT DOCUMENTS

WO    2004109075 A1    12/2004

OTHER PUBLICATIONS

C. Wilkes et al., "NOx Reduction From Gas Turbine Combustor Using Exhaust Gas Recirculation," The American Society of Mechanical Engineers, Joint Power Generation Conference, Sep. 28-Oct. 2, 1980, pp. 1-10.

* cited by examiner

*Primary Examiner* — William H Rodriguez
*Assistant Examiner* — Young Choi
(74) *Attorney, Agent, or Firm* — Francis T. Coppa

(57) ABSTRACT

A turbine system comprises a compressor for compressing air to generate a compressed flow, an air separation unit for receiving and separating at least a portion of the compressed flow into oxygen and a low-oxygen stream, a combustor for receiving and combusting at least a portion of the low-oxygen stream, a portion of the compressed flow and a fuel to generate a high temperature exhaust gas, and a turbine for receiving and expanding the high temperature exhaust gas to generate electricity and a reduced temperature low-NOx exhaust gas.

7 Claims, 11 Drawing Sheets

US 8,191,349 B2

SYSTEM AND METHOD FOR LOW EMISSIONS COMBUSTION

BACKGROUND

The invention relates generally to gasification and combustion technologies and more specifically to methods and apparatus for low emissions combustion.

Integrated gasification combined cycle (IGCC) systems are a promising technology for power generation as they offer the possibility of producing electricity from abundant fuels such as coal biomass, pet coke, municipal waste and other fuel feedstock, with reduced emissions. An IGCC system typically includes an air separation unit (ASU), a gasification system and a gas turbine combined cycle system. Pressurized high purity oxygen is produced in the ASU and sent to gasifier. In the gasifier, fuel feedstock reacts with the oxygen in the presence of steam to produce syngas rich in carbon monoxide (CO) and hydrogen (H2). Syngas containing hydrogen is combusted in the combustor of the gas turbine combined cycle system. Current syngas combustors are diffusion burners and steam is usually used as a diluent to reduce thermal nitrogen oxide (NOx) formation. Using steam as a diluent in syngas combustion puts a limitation on the maximum turbine inlet temperature that can be achieved thus limiting the maximum efficiency.

Some of the challenges currently faced in commercializing IGCC systems for power generation include high capital cost compared to other power generation technologies such as pulverized coal plants. To improve the overall efficiency of the IGCC system, several integration schemes of the various subsystems are being explored. Some of these include supplying the steam required for syngas cleanup and combustion diluent from the heat recovery steam generator (HRSG) of the gas turbine system as well as compressing the air required for ASU using the compressor of the gas turbine.

Accordingly, there is still a need for further integration of the various sub systems of the IGCC system to increase the overall efficiency and a need for developing combustion technologies that allow higher turbine inlet temperatures without correspondingly increasing thermal NOx formation.

BRIEF DESCRIPTION

A turbine system comprises a compressor for compressing air to generate a compressed flow, an air separation unit for receiving and separating at least a portion of the compressed flow into oxygen and a low-oxygen stream, a combustor for receiving and combusting at least a portion of the low-oxygen stream, a portion of the compressed flow and a fuel to generate a high temperature exhaust gas, and a turbine for receiving and expanding the high temperature exhaust gas to generate electricity and a reduced temperature low-NOx exhaust gas.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
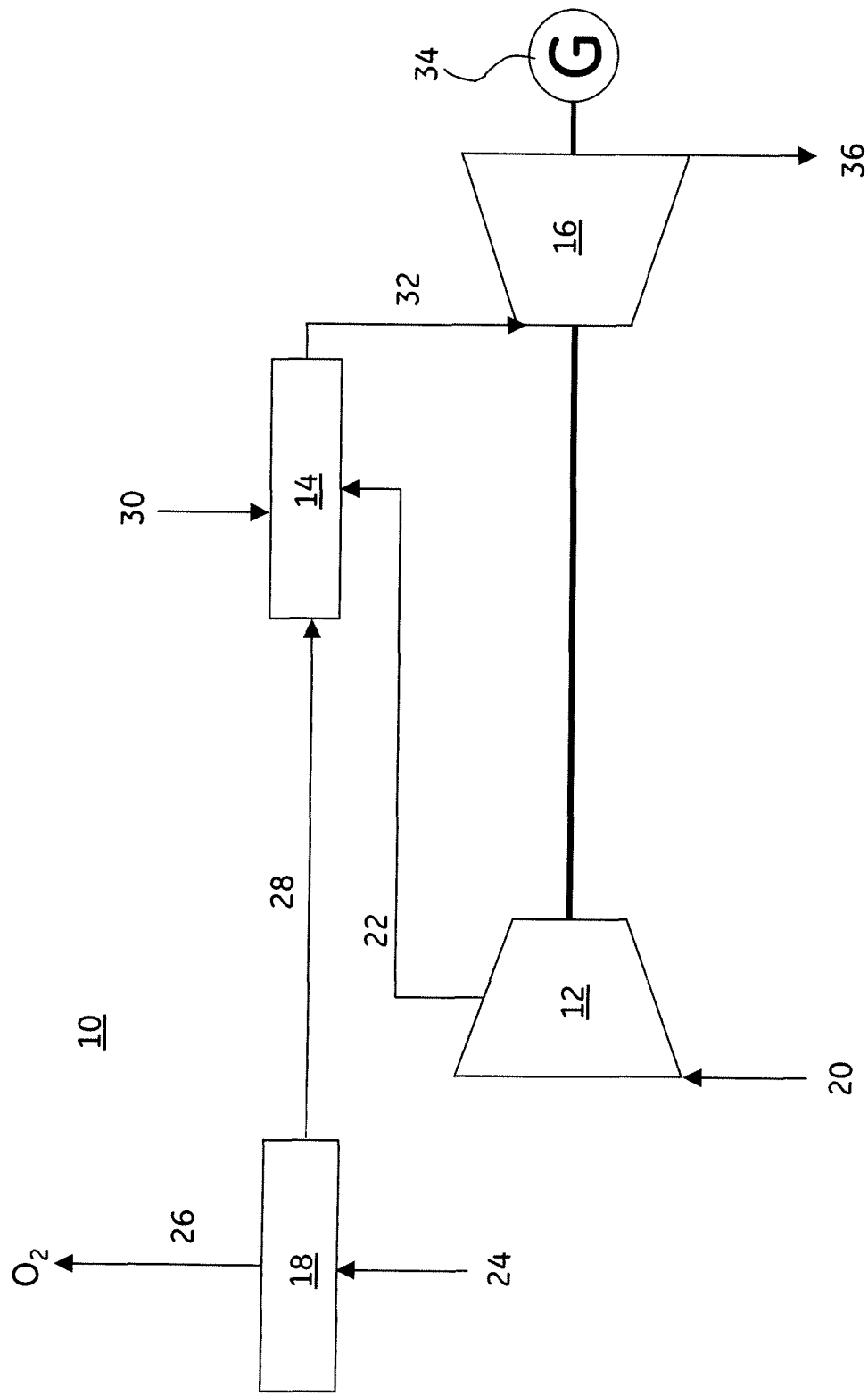
FIG. 1 is a schematic illustration of one embodiment of the instant invention.

A turbine system 10 comprising a compressor 12, a combustor 14, a turbine 16 and an air separation unit (ASU) 18, is shown in FIG. 1. As used herein, the term ASU means any system or subsystem that can take in air and issue an oxygen stream and a low-oxygen stream and optionally a nitrogen stream. As used herein, the term oxygen stream means a stream consisting of greater than about 80% by volume of oxygen, while the term low-oxygen stream means a stream consisting of less than about 20% by volume of oxygen.

Air 20 is compressed within compressor 12 to produce a compressed flow 22. A second stream of air 24 is introduced within ASU 18 to produce an oxygen ($O_2$) stream 26 and a low-oxygen stream 28. At least a portion of the low-oxygen stream 28 and at least a portion of the compressed flow 22 are directed to combustor 14 for combustion with a fuel 30 to produce a high-pressure, high temperature exhaust gas 32. The high temperature exhaust gas 32 is directed to turbine 16 for expansion and generation of electricity via generator 34 and a reduced temperature low-NOx exhaust gas 36. As used herein, the term low-NOx exhaust gas means an exhaust gas having less than about 30 parts per million (ppm) of NOx, and typically less than about 20 ppm and often less than about 10 ppm. In fact, in some embodiments, the NOx level can be as low as 5 ppm and less. The low-oxygen stream 28 dilutes the overall oxygen content within the combustor 14, thereby lowering the peak combustion temperature and decreasing the NOx production. Air 20, without the dilution from the low-oxygen stream 28, typically has an oxygen content of about 21%. With the addition of all or a portion of the low-oxygen stream 28 into the combustor, the oxygen content of the combined combustion air is less than about 21% and typically between about 10% to about 20%, and often between 15% to about 18%. Additionally, the NOx production is also reduced due to the reduced partial oxygen pressure in the combustion flame.

Figure 2:
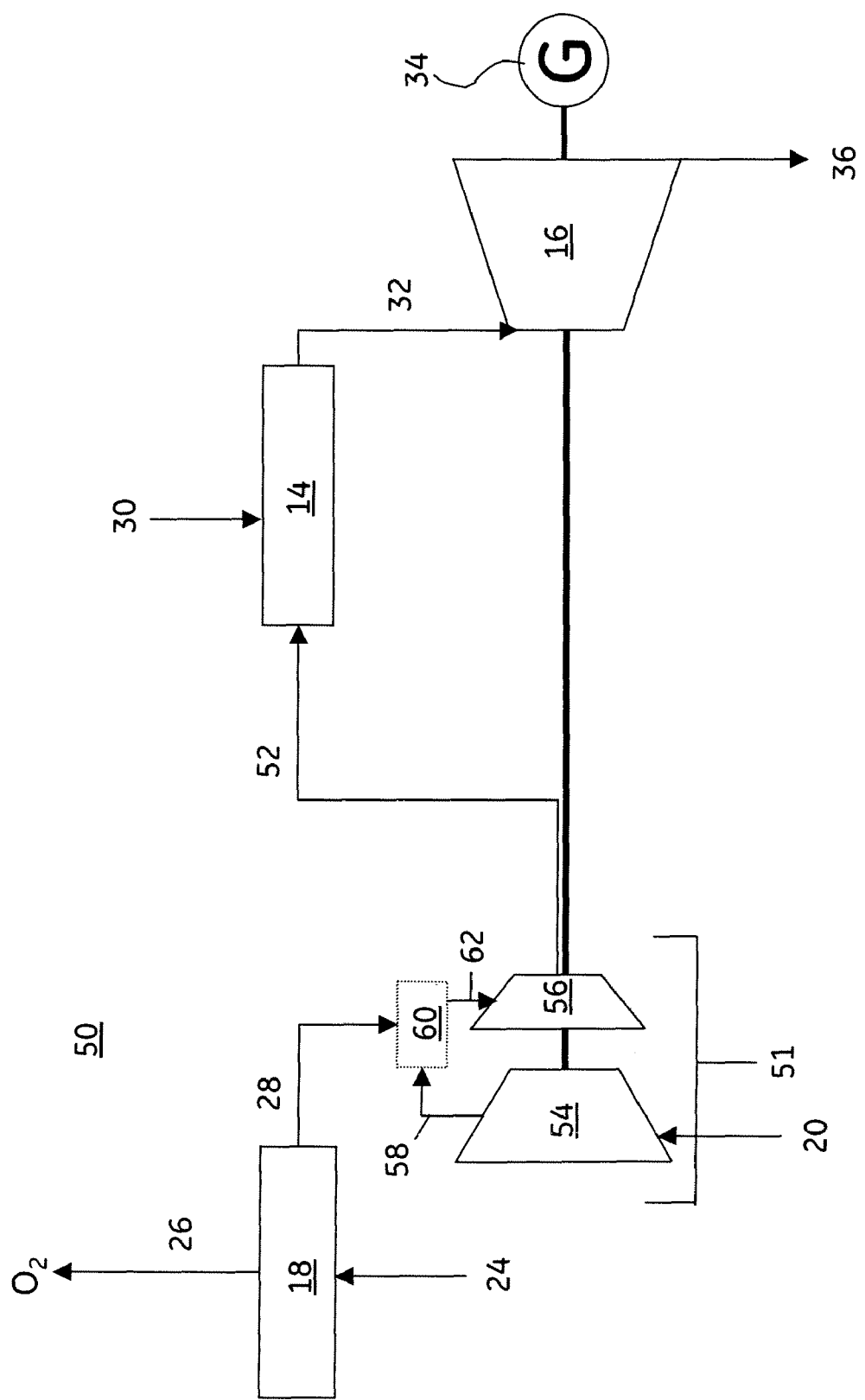
FIG. 2 is a schematic illustration of another embodiment of the instant invention.

In another embodiment of the invention 50, the low-oxygen stream 28 is directed to a compressor 51 and is compressed along with air 20 to produce a mixed compressed flow 52, as shown in FIG. 2. The mixed compressed flow 52 is directed to combustor 14 for combustion with fuel 20 to produce high-pressure, high temperature exhaust gas 32. The high temperature exhaust gas 32 is directed to turbine 16 for expansion and generation of electricity via generator 34 and a reduced temperature low-NOx exhaust gas 36. In one embodiment of the invention, the compressor 51 comprises a first-stage compressor section 54 and a second-stage compressor section 56. In one embodiment, the low-oxygen stream 28 is directed into second-stage compressor section 56 for mixing with a compressed flow 58 from first-stage compressor section 54. In yet another embodiment of the invention, an optional intercooler 60 receives and mixes the low-oxygen stream 28 and the compressed flow 58 to produce a mixed stream 62 that is directed to second-stage compressor section 56 for compression to produce mixed compressed flow 52. This embodiment is particularly attractive because several commercial gas turbine systems, for example the GE LMS 100, currently utilize a multi-stage compressor and an intermediate intercooler making retrofit applications both desirable and practical to implement.

Figure 3:
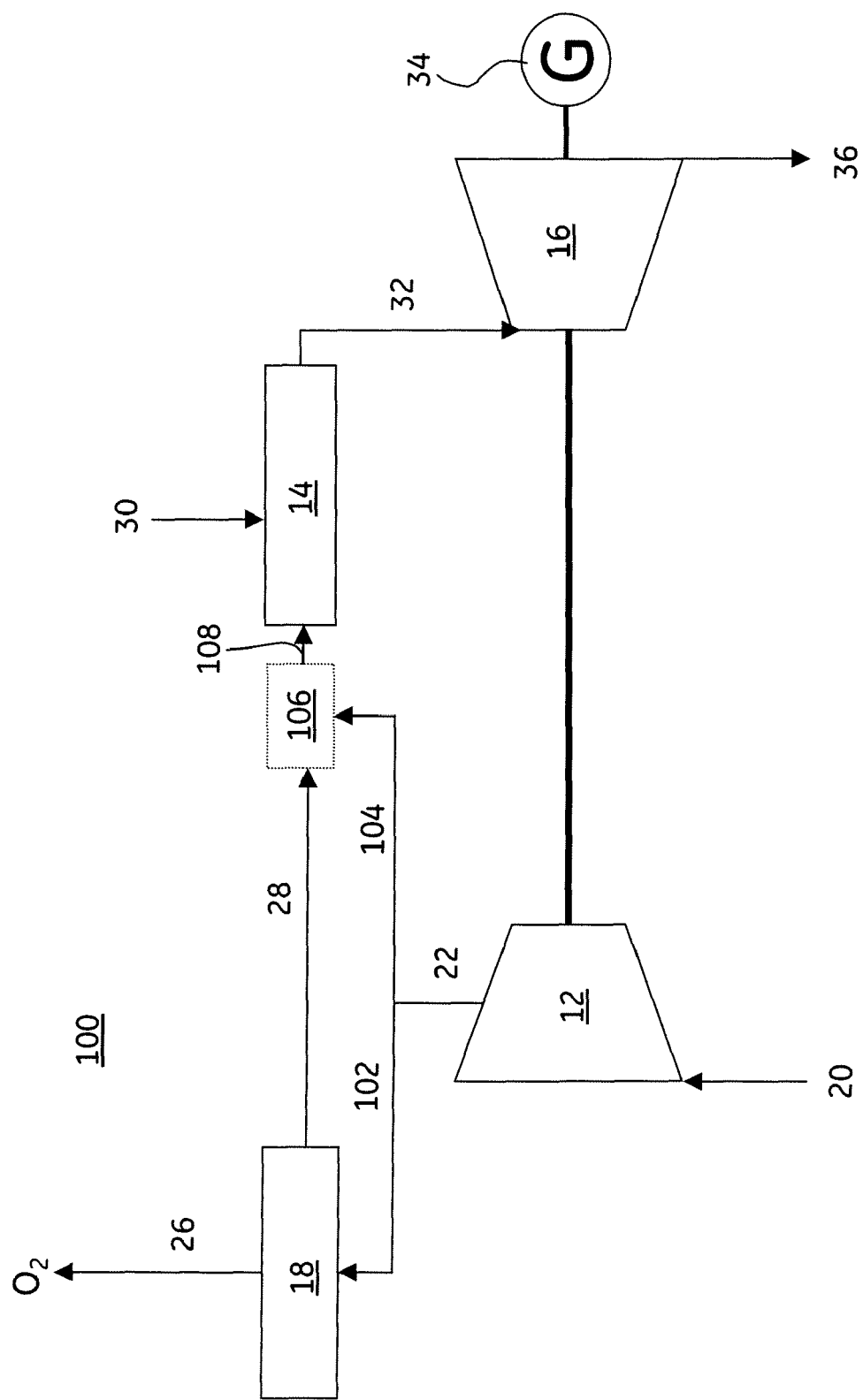
FIG. 3 is a schematic illustration of another embodiment of the instant invention.

In another embodiment of the invention 100, the compressed flow 22 is split into two streams a first portion 102 and a second portion 104, as shown in FIG. 3. The first portion 102 of compressed flow 22 is directed to ASU 18 to produce oxygen stream 26 and low-oxygen stream 28. The second portion 104 is directed to an optional mixer 106 where the second portion 104 is mixed with the low-oxygen stream 28 to form a mixed flow 108. The mixed flow 108 is then directed to combustor 14 for combustion with fuel 30. (Alternatively, the second portion 104 and the low-oxygen stream 28 are directed into combustor 14.) In this embodiment, the system advantageously uses only one compression cycle to compress both the air directed to the combustor 14 and the air directed to the ASU 18, thereby saving capital investment, operating and maintenance expenses, and limiting the overall footprint of the system.

Figure 4:
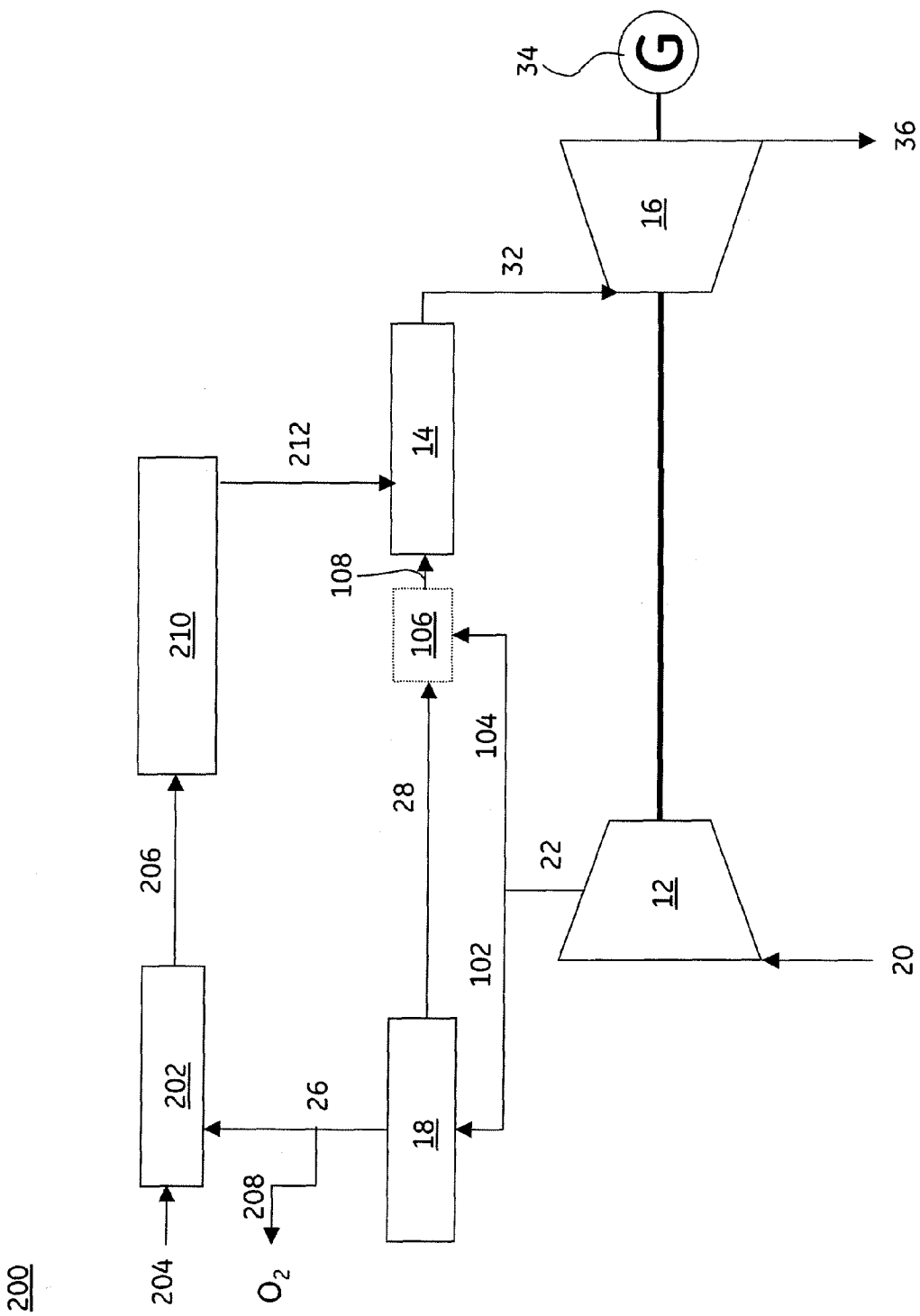
FIG. 4 is a schematic illustration of another embodiment of the instant invention.

In another embodiment of the invention 200, the oxygen stream 26 is directed to a gasifier 202 where it is reacted with a carbonaceous feedstock 204 to produce a syngas 206, as shown in FIG. 4. A portion 208 of oxygen stream 26 can be split off and otherwise utilized, for example, portion 208 could be captured, stored or transported. Syngas 206 is then directed to a syngas processing system 210 for converting the syngas 206 to a purified combustible fuel 212. The purified combustible fuel 212 is directed into combustor 14 for combustion with the mixed flow 108. This embodiment provides the advantage of applying the low NOx solution to existing gasification systems. Most gasification systems include an ASU as a standard component of the system, so system integration would be straightforward.

Figure 5:
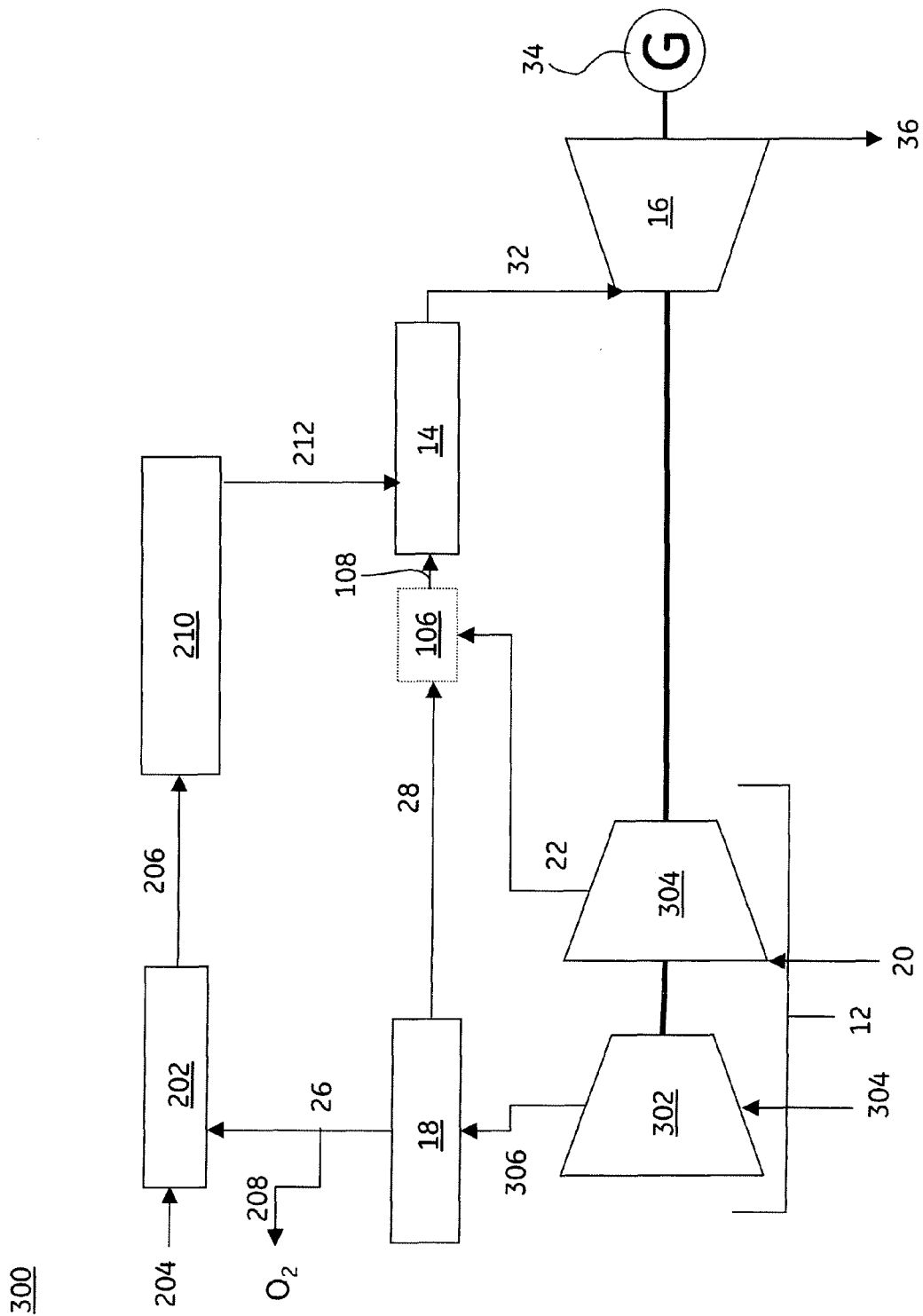
FIG. 5 is a schematic illustration of another embodiment of the instant invention.

In another embodiment of the invention 300, the compressor 12 comprises a first stage compressor 302 and a second stage compressor 304, as shown in FIG. 5. Air 305 is directed to first stage compressor 302 for generating a compressed stream 306 that is directed to ASU 18. Second stage compressor 304 receives air 20 and generates compressed stream 22 that is directed to mixer 106 for mixing compressed stream 22 with low-oxygen stream 28.

Figure 6:
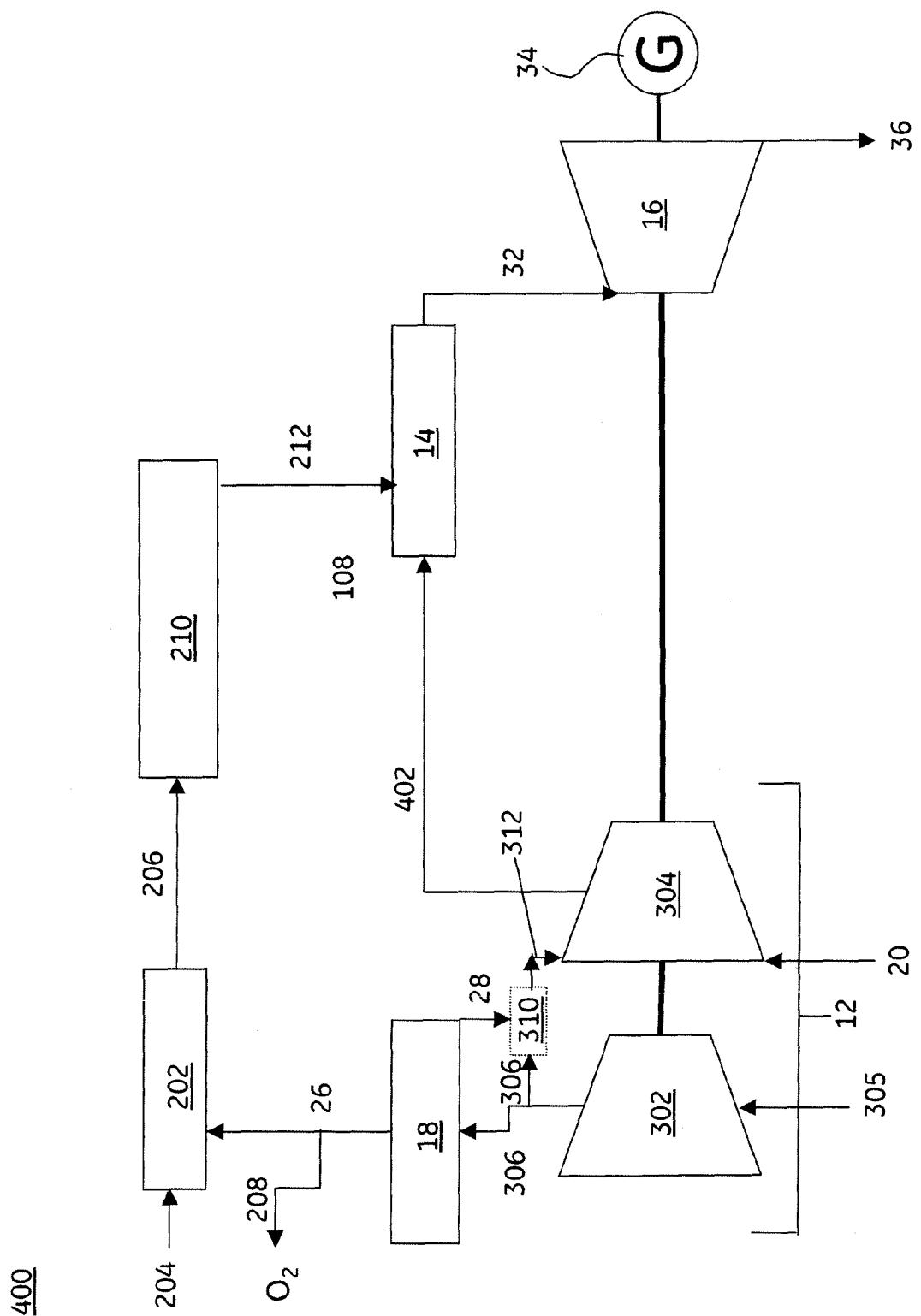
FIG. 6 is a schematic illustration of another embodiment of the instant invention.

In another embodiment of the invention 400, the low-oxygen stream 28 is directed into second stage compressor 304 and is compressed along with air 20 to produce a mixed compressed flow 402, as shown in FIG. 6. The mixed compressed flow 402 is directed to combustor 14 for combustion with the purified combustible fuel 212 to produce high-pressure, high temperature exhaust gas 32. The high temperature exhaust gas 32 is directed to turbine 16 for expansion and generation of electricity via generator 34 and a reduced temperature low-NOx exhaust gas 36. In yet another embodiment of the invention, an optional intercooler 310 receives and mixes the low-oxygen stream 28 and at least a portion of the compressed stream 306 to produce a mixed stream 312 that is directed to second-stage compressor section 304 for compression to produce mixed compressed flow 402.

Figure 7:
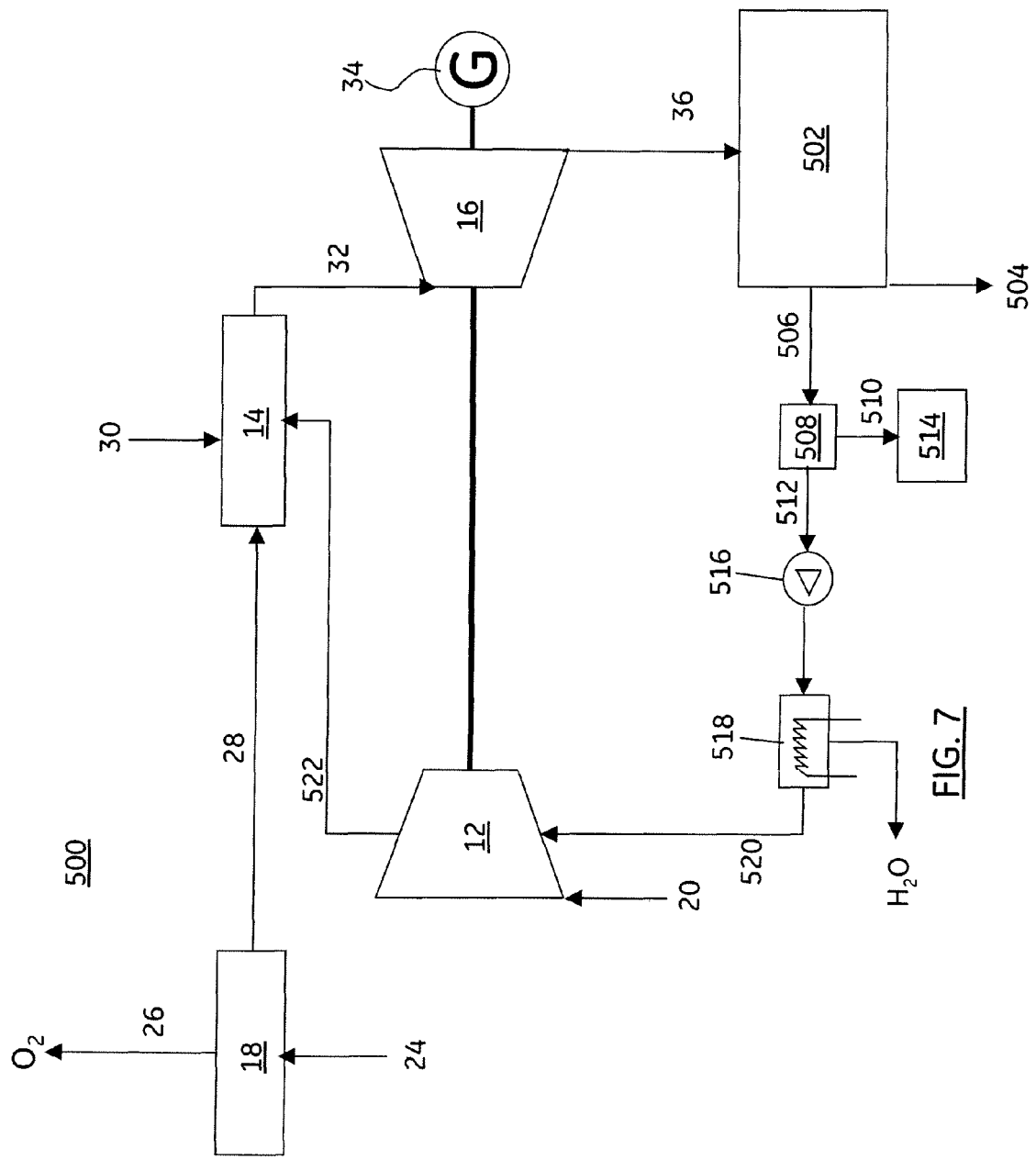
FIG. 7 is a schematic illustration of another embodiment of the instant invention.

In another embodiment of the invention 500, the embodiment discussed in relation to FIG. 1 is further modified to include an Exhaust Gas Recirculation (EGR) circuit, as shown in FIG. 7. The low-NOx exhaust gas 36 produced by turbine 16 is directed to a Heat Recovery Steam Generator (HRSG) 502 for the generation of steam 504 and a reduced temperature exhaust gas 506. The steam 504 is typically directed to a steam turbine bottoming cycle (not shown) for the generation of additional electricity. The reduced temperature exhaust gas 506 is directed to a flow-splitting device 508 for splitting the reduced temperature exhaust gas 506 into at least a first portion 510 and a second portion 512. In one embodiment, the first portion 510 is directed to a carbon dioxide capture system 514 for the removal and isolation of carbon dioxide contained within the stream. In one embodiment, the first portion 510 is between about 50% to about 80% of the reduced temperature exhaust gas 506.

Figure 8:
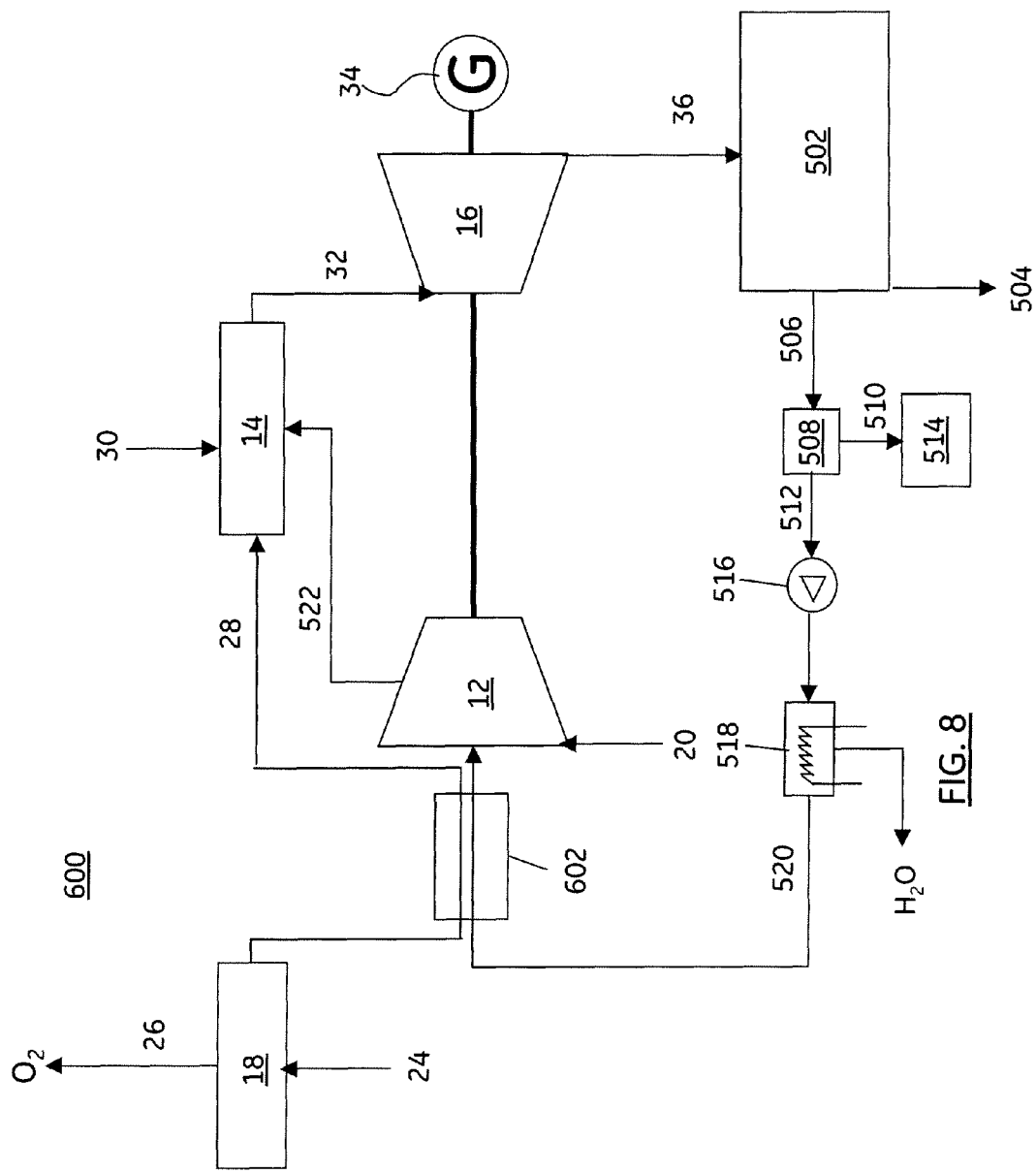
FIG. 8 is a schematic illustration of another embodiment of the instant invention.

The second portion 512 of reduced temperature exhaust gas 506 is directed, typically via a pump 516, to a water removal system 518, for example a condenser, to remove any excess water and produce a low-oxygen, low-water stream 520. In one embodiment, the second portion 512 is between about 20% to about 50% of the reduced temperature exhaust gas 506. The low-oxygen, low-water stream 520 is directed into compressor 12 for compression along with air 20 to produce a low-oxygen compressed flow 522. The NOx formation within combustor 14 is significantly reduced as compared to prior art systems as the combustor 14 is receiving multiple streams with a reduced oxygen content, low oxygen compressed flow 522 and low-oxygen stream 28. The NOx formation is reduced because of the reduced partial oxygen pressure in the combustion flame and the lower temperature of the flame compared to combustion of atmospheric air. Additionally, carbon dioxide capture is made significantly easier in this system as the first portion 510 of reduced temperature exhaust gas 506 has a lower volumetric flow and a higher carbon dioxide content making the capture and isolation of the carbon dioxide much more efficient with a smaller overall system footprint. In one embodiment 600, low-water stream 520 is directed into a heat exchanger 602 along with low-oxygen stream 28 for heat exchange therebetween as the temperature of the low-water stream 520 is reduced prior to entry into compressor 12 and the temperature of low-oxygen stream 28 is raised prior to entry into combustor 14, as shown in FIG. 8.

Figure 9:
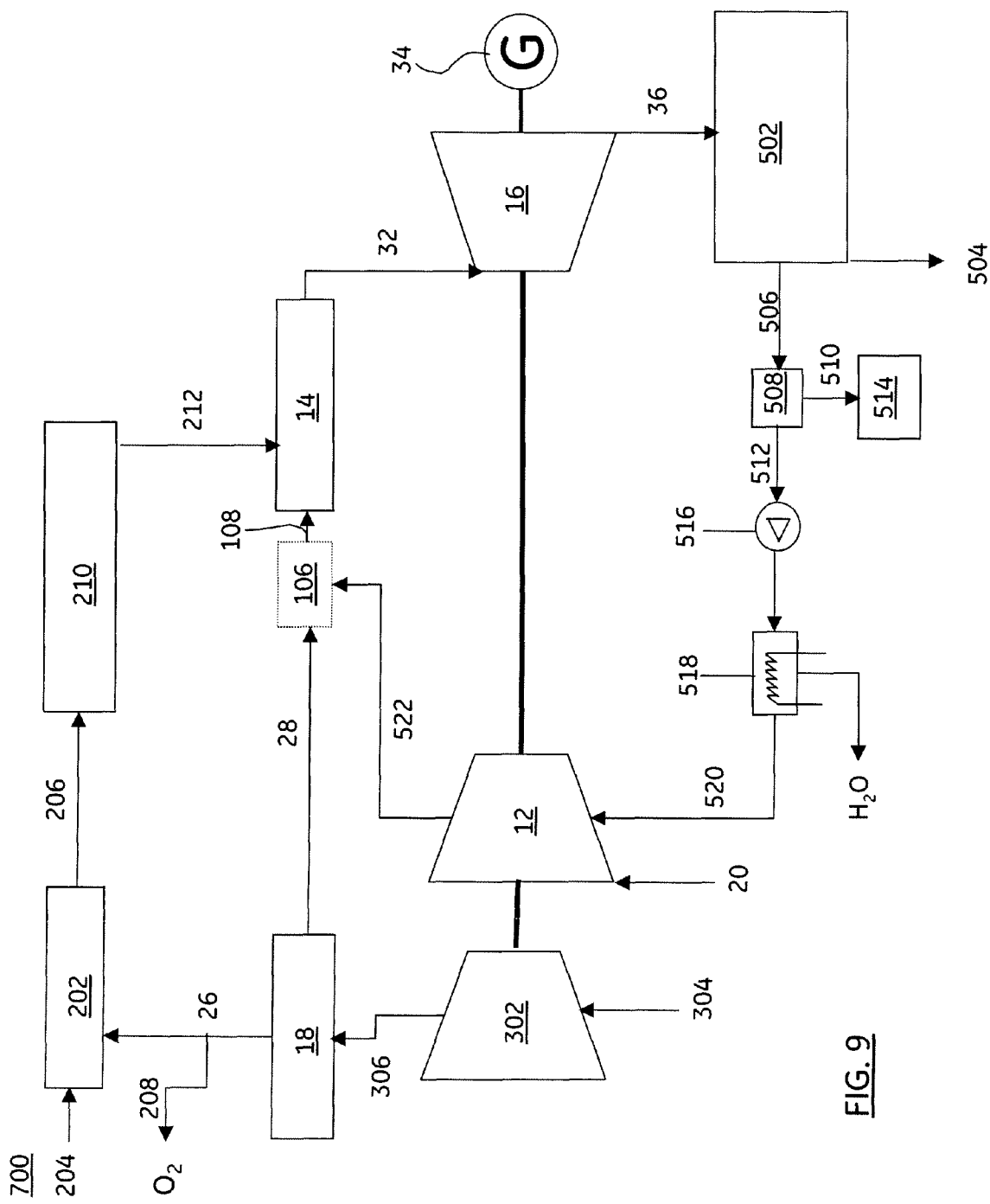
FIG. 9 is a schematic illustration of another embodiment of the instant invention.

In another embodiment of the invention 700, the embodiment discussed in relation to FIG. 5 is further modified to include an Exhaust Gas Recirculation (EGR) circuit, as shown in FIG. 9. The low-oxygen, low-water stream 520 is directed into compressor 12 for compression along with air 20 to produce a low-oxygen compressed flow 522.

Figure 10:
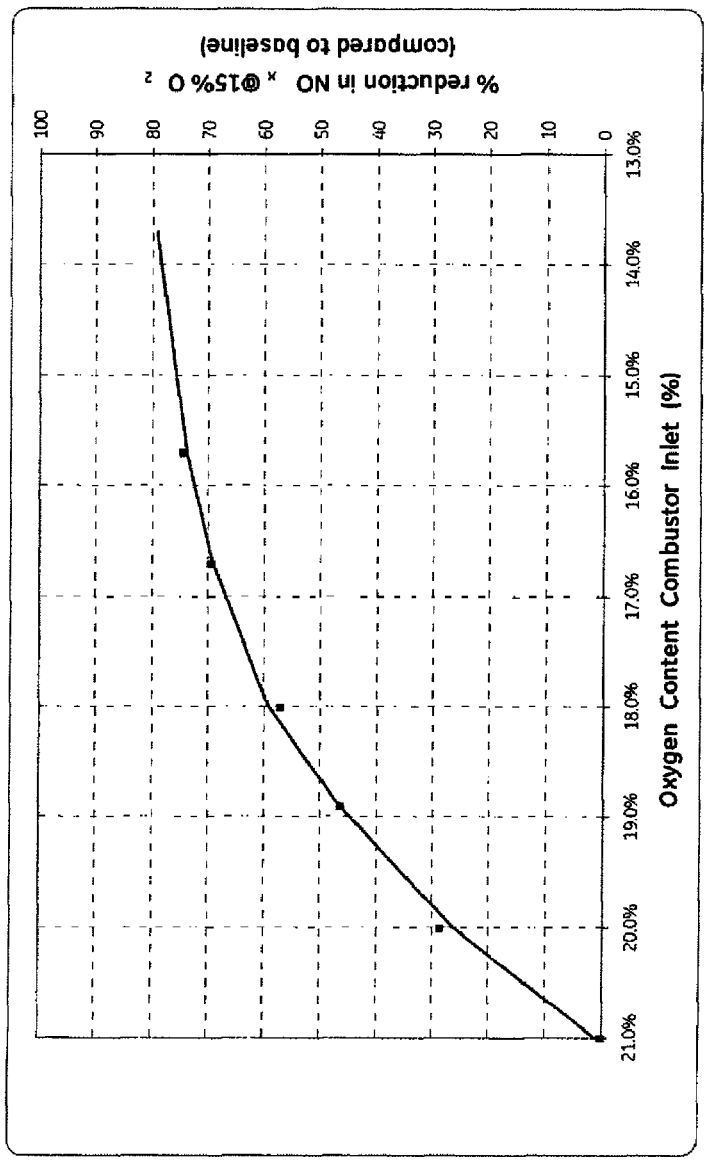
FIG. 10 is a graphical illustration of NOx data for varying levels of oxygen content at a combustor inlet.

FIG. 10 is a graphical illustration of NOx reduction (corrected to 15% oxygen by volume) demonstrated in certain experiments plotted against the oxygen level at the inlet of the combustor maintained at a fixed flame temperature of about 2900° F. As shown from the data, a significant reduction in NOx occurs as the oxygen content in the combustion air changes from the standard 21% by volume to 14% by volume. As demonstrated from these experiments, a NOx reduction of about 80 percent is measured at the 14% oxygen content level as compared to the baseline level of 21% oxygen content.

Figure 11:
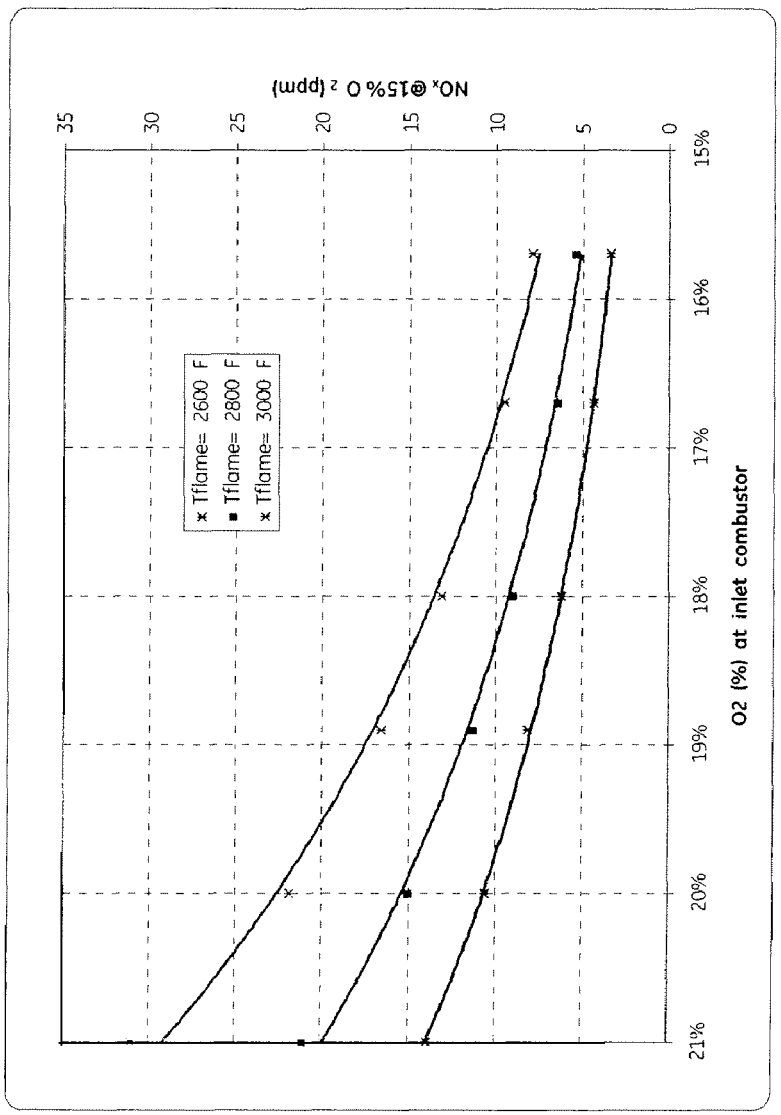
FIG. 11 is a graphical illustration of NOx data for varying levels of oxygen content at a combustor inlet and at various combustor flame temperatures.

FIG. 11 is another graphical illustration showing the NOx levels in ppm (corrected to 15% oxygen by volume) demonstrated in certain experiments plotted against the oxygen level at the combustor inlet for three different flame temperatures, about 2600° F., about 2800° F., and about 3000° F. As shown from the data, a significant reduction in NOx levels occurs as the oxygen content in the combustion air changes from the standard 21% by volume to about 16% by volume and less. As shown, for all three flame temperatures, the NOx levels at 16% by volume of oxygen are less than about 10 ppm and in one case less than 5 ppm, providing a significant reduction in NOx levels from the baseline.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A turbine system comprising:
   a compressor for compressing a first stream of air to generate a compressed flow;
   an air separation unit for receiving and separating a second stream of air into oxygen and a low-oxygen stream;
   a combustor for receiving and combusting at least a portion of said low-oxygen stream, a portion of said compressed flow and a fuel to generate a high temperature exhaust gas;
   a turbine for receiving and expanding said high temperature exhaust gas to generate electricity and a reduced temperature low-NOx exhaust gas;
   an Exhaust Gas Recirculation (EGR) circuit including a Heat Recovery Steam Generator (HRSG), wherein said reduced temperature low-NOx exhaust gas is directed to the HRSG for the generation of steam and a reduced temperature exhaust gas;
   a flow splitter for splitting said reduced temperature exhaust gas into a first portion and a second portion that is directed to said compressor for compression along with said first stream of air;
   a carbon dioxide capture system for receiving the first portion;
   a water removal system for receiving and removing excess water from the second portion to produce a low-oxygen, low-water stream; and
   a heat exchanger for receiving said second portion and said low-oxygen stream from said air separation unit for heat exchange therebetween.

2. A turbine system in accordance with claim 1, wherein said steam is directed to a bottoming cycle for the generation of additional electricity.

3. A turbine system in accordance with claim 1, wherein the first portion is between about 50% to about 80% of the reduced temperature exhaust gas.

4. A turbine system in accordance with claim 1, wherein said low-oxygen stream has less than about 20% by volume of oxygen.

5. A turbine system in accordance with claim 1, wherein said low-oxygen stream has less than about 15% by volume of oxygen.

6. A turbine system in accordance with claim 1, wherein said low-NOx exhaust gas has a NOx level of less than about 30 ppm.

7. A turbine system in accordance with claim 1, wherein said low-NOx exhaust gas has a NOx level of less than about 10 ppm.

* * * * *